United States Patent [19]
Kennedy et al.

[11] Patent Number: 6,166,631
[45] Date of Patent: Dec. 26, 2000

[54] METHOD AND APPARATUS FOR ALERTING A VEHICLE DRIVER OF AN OPERATING CONDITION

[75] Inventors: John Francis Kennedy, Dearborn; Matthew David Gerard, Westland, both of Mich.

[73] Assignee: Ford Global Technologies, Inc., Dearborn, Mich.

[21] Appl. No.: 09/090,544

[22] Filed: Jun. 4, 1998

[51] Int. Cl.[7] ....................................... B60Q 1/00
[52] U.S. Cl. ................... 340/457.3; 340/439; 340/457.1
[58] Field of Search ................ 340/439, 457.3, 340/457.1, 425.5, 453, 456; 307/10.1; 180/271

[56] References Cited

U.S. PATENT DOCUMENTS

| | | | |
|---|---|---|---|
| 2,584,938 | 2/1952 | Sweeny et al. | 340/457.3 |
| 2,724,101 | 11/1955 | Hallman | 340/457.3 |
| 2,904,774 | 9/1959 | Bossarte | 340/457.3 |
| 4,855,709 | 8/1989 | Naderi | 340/457.3 |
| 4,871,994 | 10/1989 | Takeda et al. | 340/457.3 |
| 5,394,137 | 2/1995 | Orschek | 340/457.3 |
| 5,714,930 | 2/1998 | McKinney, Jr. | 340/468 |
| 5,760,684 | 6/1998 | Orbach | 340/457.1 |

FOREIGN PATENT DOCUMENTS

| | | |
|---|---|---|
| 45-20421 | 7/1970 | Japan . |
| 57-99451 | 6/1982 | Japan . |

*Primary Examiner*—Brent A. Swarthout
*Attorney, Agent, or Firm*—Gregory P. Brown

[57] ABSTRACT

A method and apparatus for alerting a vehicle driver of a primary operating condition in a vehicle, includes detecting the primary operating condition. A primary warning indicator is then activated when the primary operating condition is detected. When a secondary operating condition is detected while the primary warning indicator is activated a secondary indicator is activated. The primary and secondary warning indicators are deactivated when the primary operating condition ceases to exist.

6 Claims, 1 Drawing Sheet

METHOD AND APPARATUS FOR ALERTING A VEHICLE DRIVER OF AN OPERATING CONDITION

BACKGROUND OF THE INVENTION

1. Field of the Invention

This invention relates to a method and apparatus for alerting a vehicle driver of an operating condition. More particularly, this method and apparatus uses a primary warning triggered under a first condition coupled with a secondary warning triggered by a second condition to ensure the vehicle operator is aware of the operating condition.

2. Disclosure Information

It is known in the art to use a warning light to alert the driver of certain driving conditions. For instance, when a parking brake is actuated, a switch operatively lights a warning lamp located within the drivers peripheral view. It has been observed that under some circumstances, vehicle drivers have ignored or otherwise not noticed the illuminated warning lamp. Operating the vehicle with the parking brake so engaged may be detrimental to the brakes as well as significantly reducing the efficiency of the vehicle.

An alternative to warning lamps includes the use of audible alarms, such as buzzers, chimes and even synthesized voice messages. One common implementation is found on vehicles with seatbelt usage warnings. These vehicles combine a visual and audible alarm, both of which are triggered when the vehicle is occupied and the ignition is turned. Seatbelt usage warnings combining visual and audible alarms generally deactivate after a short period, such as ten seconds, when the belts remain unused. One possible explanation for this limited warning period is that audible alarms are perceived as annoying to vehicle drivers, and where they did not shut themselves off, vehicle owners permanently disabled them, rendering them useless.

It would therefore be desirable to improve the effectiveness of warning vehicle drivers of certain operating conditions of their vehicle, while not presenting a potentially annoying condition which might result in some owners disabling the warning system altogether.

SUMMARY OF THE INVENTION

Accordingly, the present invention provides a method for alerting a vehicle driver of a primary operating condition in a vehicle comprises the steps of: detecting the primary operating condition; activating a primary warning indicator when said primary operating condition is detected; detecting a secondary operating condition; activating a secondary warning indicator when both said primary operating condition and said secondary operating condition are detected; and deactivating said primary warning indicator and said secondary warning indicator when said primary operating condition ceases to exist.

According to the present invention, an apparatus for alerting a vehicle driver of an applied parking brake in a vehicle includes a first device for detecting when the parking brake is applied and a second device for detecting a secondary operating condition. The apparatus also includes a control module having a micro-processor operatively connected with the first and second devices. Using information from these devices, the processor activates a visual warning indicator when the parking brake is applied and activates a secondary warning indicator when both the parking brake is applied and the secondary operating condition is detected. The processor also deactivates the visual warning indicator and the secondary warning indicator when the parking brake is no longer applied.

It is an object of the present invention to provide a method and apparatus for alerting a driver of an operating condition of the vehicle in a first manner followed by a second, possibly more effective manner to provide the greatest assurance that the vehicle driver is aware of the operating condition.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
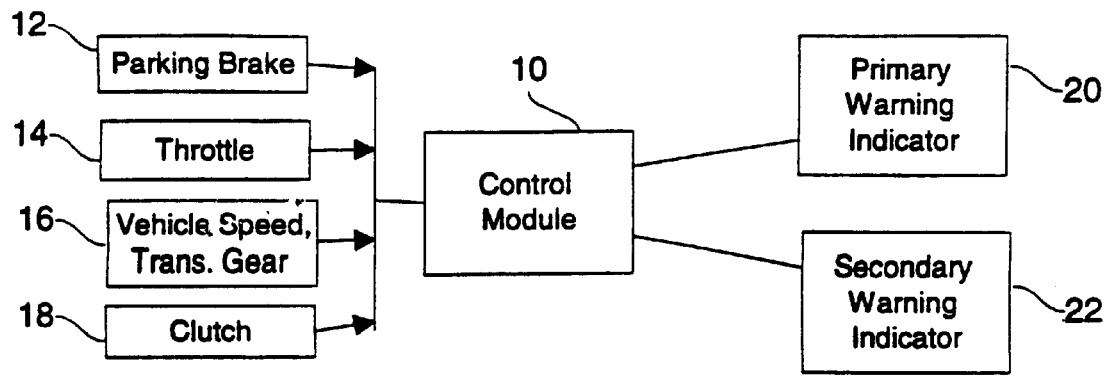
FIG. 1 shows a schematic block diagram of a control system in accordance with the present invention.

As shown in FIG. 1, the method and apparatus of the present invention may advantageously be incorporated into a vehicle systems monitoring control module 10. The control module is operatively connected to various sensors and in communications with other vehicle systems, such as engine and transmission control systems, within the vehicle. The control module can use various data to perform a wide range of tasks, including providing information to the driver. While the present invention will be described as used to alert a driver regarding the operating state of a parking brake as the primary operating condition, those skilled in the art will appreciate in view of this disclosure that a system according to the present invention could be utilized to alert a driver about other primary operating conditions. Examples include seat belt usage, low tire pressure, high beams while facing oncoming traffic and other conditions that seek immediate action on the part of the vehicle operator.

The component parts of a system according to the present invention are shown in FIG. 1. Accordingly, control module 10 receives inputs from a parking brake sensor 12, a throttle signal 14, a speed signal and transmission gear signal from a transmission controller 16, and a clutch sensor 18,. In return, the control module 10 activates or deactivates primary and secondary warning indicators, 20, 22. Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data are being processed. Those skilled in the art will appreciate in view of this disclosure that although the driver alert system described herein operates according to digital electronics principles, the present invention could be practiced through the use of analog electronics.

The parking brake sensor 12, whether cooperating with a foot or hand actuated parking brake mechanism, may comprise any number of commonly available proximity switches. The switches cooperates with the brake actuation lever such that when the parking brake is actuated the proximity switch is either open or closed, indicating that the brake is applied. Alternatively, the switch can be mounted so as to open or close upon completely releasing the parking brake, such that when the parking brake is released, or not actuated, the proximity switch is either open or closed, indicating that the brake is released. The choice of whether the switch is open or closed in either case is a matter of design choice.

The variety of information available on vehicle operating conditions make it possible to use more than a single operating condition as a secondary operating condition. In the simplest form of the present invention, which will be described further below, a single operating condition is selected as the secondary operating condition to be monitored. The throttle signal 14 is communicated to the control module by an engine controller, which acquires the throttle signal from a conventional throttle position sensor in a conventional manner as commonly used for engine control purposes. Similarly, the vehicle speed signal and transmission gear signal 16 can be acquired from a transmission controller, which in fact may be common with the engine controller. Alternatively, the transmission gear signal may come directly from a proximity switch located within the gating of a gear selecting actuator.

Where it is desirable, the clutch signal 18 is acquired in a similar manner as the foot operated parking brake signal. That is a proximity switch is positioned such that it either opens or closes upon actuation of a clutch lever.

In the preferred embodiment, the primary warning indicator 20 is of the visual type of indicators, commonly nothing more than a masked lamp that illuminates a message, such as "BRAKE" upon initial activation. It should be recognized that the primary warning indicator could be a sophisticated messaging center or any other form of communication intended to get the attention of the vehicle driver. It is extremely difficult, in almost all cases, to place all of the various warning indicators so as to ensure that they will not be ignored or unnoticed by the vehicle driver.

The preferred secondary warning indicator 22 is of the audible type of indicators, generally nothing more than a buzzer or chime as can be currently found on many vehicles to indicate an open door. Here, too, it should be recognized that any warning indicator may serve as the secondary warning indicator as long as it is characterized as something that is extremely difficult to ignore. This characteristic will, in almost all instances, assure that the vehicle driver will take corrective action rather than endure to the secondary warning indicator. The fact that it is a secondary warning indicator and does not activate until a secondary operating condition exists minimizes the likelihood disablement by the vehicle owner.

Figure 2:
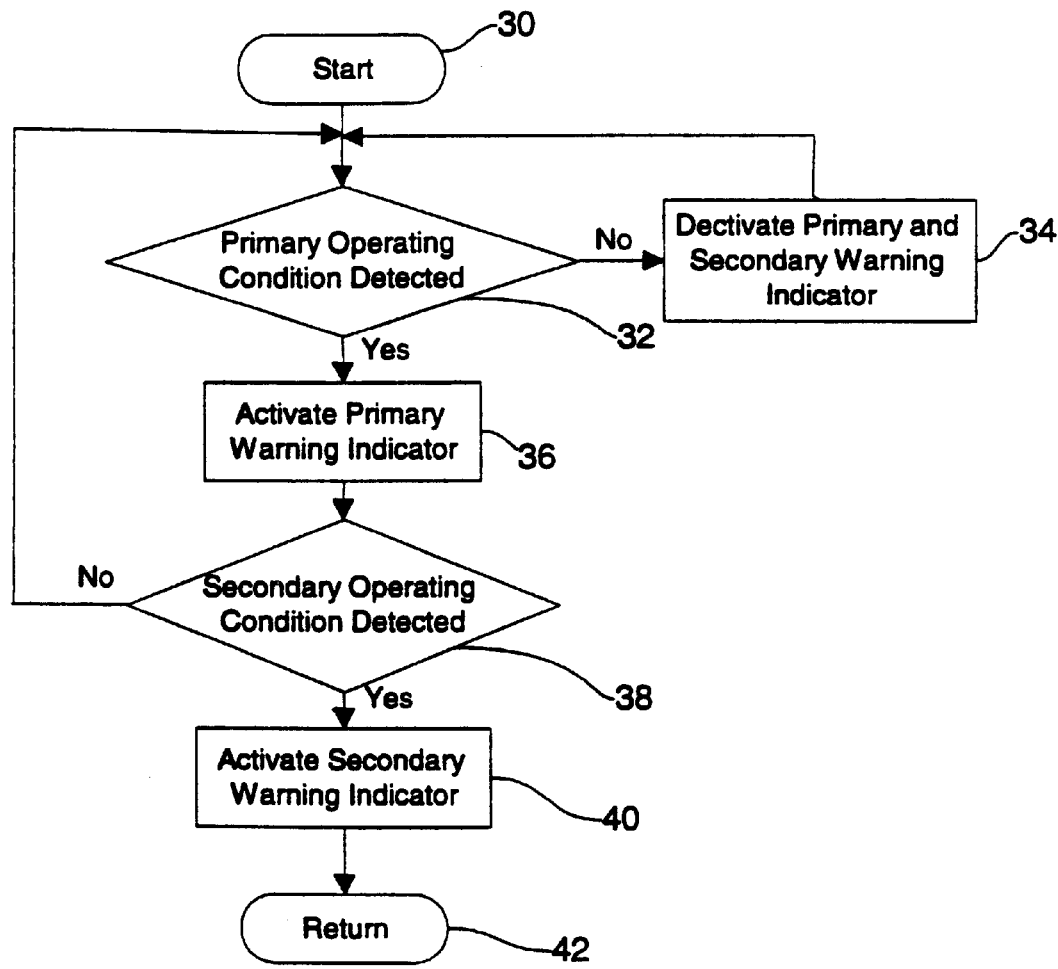
FIG. 2 contains a logic flow block diagram in accordance with an embodiment of this invention.

Referring now to FIG. 2, the logic flow block diagram is illustrated in accordance with an embodiment of this invention. Beginning at start block 30 of the logic flow diagram, the processor within control module 10 transfers to block 32 and a primary operating condition is detected, which in the presently preferred embodiment happens to be a praking brake actuation condition. If the parking brake is not actuated, the processor transfers back to block 32 through the deactivation block 34. If the parking brake is actuated, the processor transfers to block 36 wherein a primary warning indicator is activated, which in the presently preferred embodiment happens to be the illumination of a brake warning lamp.

Having illuminated the brake warning lamp, the processor transfers to block 38 and detects whether a second operating condition exists, which in the presently preferred embodiment happens to be a transmission gear signal. If the gear signal indicates the vehicle is in "Park", the processor transfers back to block 32. If the gear signal indicates the vehicle is not in "Park", the processor transfers to block 40 and activates the secondary warning indicator 22, which in the presently preferred embodiment happens to be an audible chime. As an optional step, to aid the vehicle driver in identifying the primary warning indicator 20, it might be useful to modify the primary warning indicator display simultaneously with the activation of the secondary warning indicator. For instance, it would be desirable to cycle the brake warning lamp while the secondary warning indicator is actuated. The processor then returns to block 32 through the return block 42.

It should be apparent that the processor could evaluate different operating conditions for the secondary operating condition at block 38. As suggested above, under certain circumstances it may be desirable to activate the secondary warning indicator upon detecting throttle actuation, clutch actuation, a non-zero vehicle velocity or even a combination of these and other possible vehicle operating conditions.

Various modifications and variations will no doubt occur to those skilled in the arts to which this invention pertains. For example, the particular sensors used in conjunction with the disclosed system may be varied from those herein and the system may be operated according to digital or analog electronics principles while remaining within the vehicle driver alert scheme described herein. These and all other variations which basically rely on the teachings to which this disclosure has advanced the art are properly considered within the scope of this invention as defined by the appended claims.

What is claimed is:

1. A method for alerting a vehicle driver of an applied brake in a vehicle, the method comprises the steps of:

detecting when the parking brake is applied;

activating a visual warning indicator when said parking brake is applied;

detecting a secondary operating condition indicative of a transmission clutch actuation;

activating a secondary warning indicator when both said parking brake is applied and said secondary operating condition is detected; and deactivating said visual warning indicator and said secondary warning indicator when said parking brake is no longer applied.

2. A method for alerting a vehicle driver of an applied brake in a vehicle, the method comprises the steps of:

detecting when the parking brake is applied;

activating a visual warning indicator when said parking brake is applied;

detecting a secondary operating condition indicative of a transmission gear selection;

activating a secondary warning indicator when both said parking brake is applied and said secondary operating condition is detected; and deactivating said visual warning indicator and said secondary warning indicator when said parking brake is no longer applied.

3. An apparatus for alerting a vehicle driver of an applied parking brake in a vehicle, said apparatus comprising:

first means for detecting when the parking brake is applied;

second means for detecting a secondary operating condition indicative of a transmission clutch actuation;

processor means operatively connected with said first and second means for activating a visual warning indicator when said parking brake is applied and activating a secondary warning indicator when both said parking brake is applied and said secondary operating condition is detected and deactivating said visual warning indicator and said secondary warning indicator when said parking brake is no longer applied.

4. A apparatus according to claim 3, wherein said secondary warning indicator includes means for generating an audible tone.

5. A apparatus according to claim 3, wherein said visual warning indicator is an illuminated warning lamp.

6. An apparatus for alerting a vehicle driver of an applied parking brake in a vehicle, said apparatus comprising:

first means for detecting when the parking brake is applied;

second means for detecting a secondary operating condition indicative of a transmission gear selection;

processor means operatively connected with said first and second means for activating a visual warning indicator when said parking brake is applied and activating a secondary warning indicator when both said parking brake is applied and said secondary operating condition is detected and deactivating said visual warning indicator and said secondary warning indicator when said parking brake is no longer applied.

* * * * *